J. W. MILNOR.
VOLTAGE REGULATOR FOR DIRECT AND ALTERNATING CURRENT GENERATORS.
APPLICATION FILED JAN. 17, 1918.

1,353,060. Patented Sept. 14, 1920.
2 SHEETS—SHEET 1

WITNESSES:

INVENTOR.
Joseph W. Milnor
BY
ATTORNEY

J. W. MILNOR.
VOLTAGE REGULATOR FOR DIRECT AND ALTERNATING CURRENT GENERATORS.
APPLICATION FILED JAN. 17, 1918.

1,353,060.

Patented Sept. 14, 1920.
2 SHEETS—SHEET 2.

WITNESSES:

INVENTOR.
Joseph W. Milnor
BY
ATTORNEY

UNITED STATES PATENT OFFICE.

JOSEPH W. MILNOR, OF NEW YORK, N. Y., ASSIGNOR TO THE WESTERN UNION TELEGRAPH COMPANY, OF NEW YORK, N. Y., A CORPORATION OF NEW YORK.

VOLTAGE-REGULATOR FOR DIRECT AND ALTERNATING CURRENT GENERATORS.

1,353,060.     Specification of Letters Patent.     Patented Sept. 14, 1920.

Application filed January 17, 1918. Serial No. 212,333.

*To all whom it may concern:*

Be it known that I, JOSEPH W. MILNOR, a citizen of the United States of America, and a resident of New York, in the county of New York and State of New York, have invented certain new and useful Improvements in Voltage-Regulators for Direct and Alternating Current Generators, of which the following is a specification.

My invention relates to means for the regulation of the voltage of both alternating current and direct current generators, and comprises means whereby the armature or armatures of a regulating relay or relays are kept normally in a state of constant rapid vibration, whereby very close regulation is effected.

The object of my invention is to regulate the voltage of generators, both alternating current and direct current, more closely than is at present practicable, to avoid "hunting" effect, and to make the regulating apparatus simple, relatively inexpensive, and highly efficient.

I will now proceed to describe my invention with reference to the accompanying drawings illustrating diagrammatically various arrangements embodying my invention, and will then point out the novel features in claims:

Figure 1 is a diagram showing one arrangement of circuits and apparatus embodying my invention, the field of the generator being energized by a separate generator, shown in this instance as a battery.

Fig. 1ª is a fragmentary diagram similar to that of Fig. 1, except that the field of the generator is shown in shunt with the armature.

Figure 1:
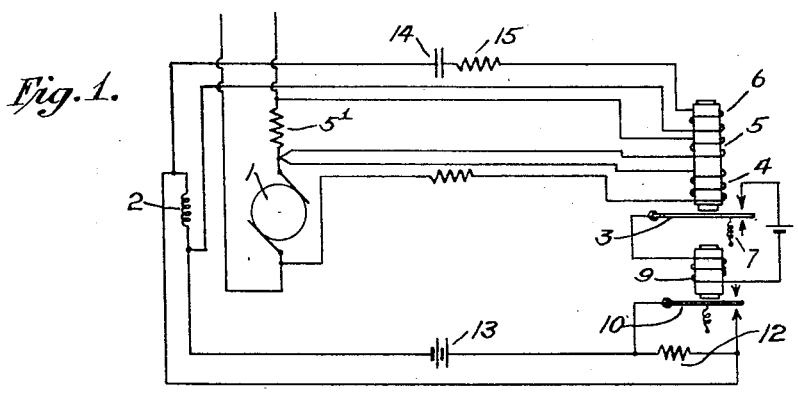
Figure 1A:
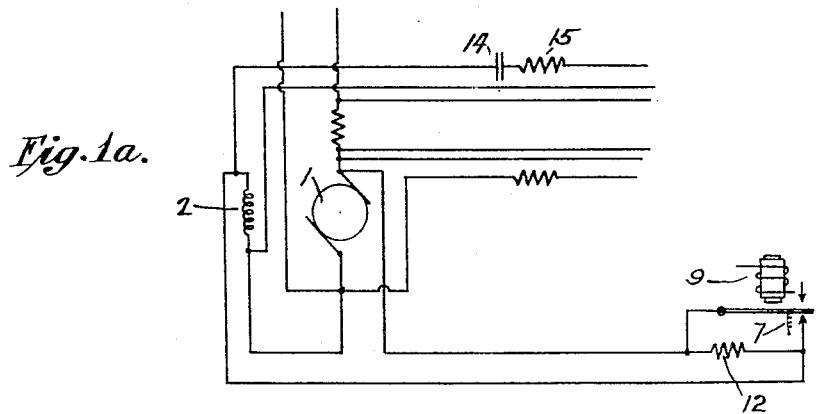

Referring first to Fig. 1: 1 designates the armature of the generator to be regulated, and 2 its field coil. 3 designates the controlling relay, and 4 one magnet coil of that relay, connected in shunt across the brushes of the generator. The magnet of this relay has, in addition to the shunt coil 4, additional windings 5 and 6, of which winding 5 is connected to the load circuit of the generator, on opposite sides of a low resistance 5', while winding 6 is connected to opposite sides of the field 2 of the generator, and may contain a condenser 14 and resistance 15.

The armature of the controlling relay 3 controls the circuit of another relay 9, the armature 10 of which controls the circuit of field 2; this field being arranged to be excited, in the particular arrangement shown, by a battery 13 (though such field circuit might be energized by being connected in shunt to the brushes of the generator, as indicated in Fig. 1ª). There is a resistance connection 12 across the contacts of the relay 9, so that the field circuit is never completely broken. It is evident that if, during the operation of the generator, the voltage of the armature circuit of that generator should increase above some predetermined value, then the armature of relay 3 will be attracted and caused to close the magnet circuit of relay 9. The magnet of this relay being thus energized, and its armature attracted, the resistance in the circuit of the generator field 2 will be increased by the inclusion in that circuit of the resistance 12 (heretofore shunted out, in effect, through the circuit of the contact points of relay 9). Inclusion of this resistance 12 in the field circuit will, of course, lower the voltage of the armature circuit of the generator. Should the voltage of the generator decrease below some predetermined value, the armature of relay 3 will be retracted, breaking the circuit of relay 9, and thereupon the armature of relay 9 will be retracted, shunting out the resistance 12, and so increasing the current strength in the field circuit of the generator and causing the voltage of that generator to rise.

With the circuits and instrument arrangement thus far described, the voltage of the generator would be caused to rise and fall alternately between small limits, and thus to maintain an average of approximately desired value; with, however, some "hunting" action. But to obviate such "hunting" action I have provided the windings 6, which are in shunt with respect to the field coil 2 and are in series with the condenser 14 and preferably with resistance 15. The action of these windings 6 is as follows:

Immediately upon closing of the contacts of relay 9, the voltage in the field circuit rises, through the shunting out of resistance 12; and thereby a momentary flow of current is caused through windings 6 of relay 3; such flow being momentary only, because of the condenser 14 in the circuit of windings 6. The armature of relay 3 having, presumably, just left its front contact point, and the voltage in the armature circuit of generator 1 being, therefore, very little, if any, below that voltage at which such armature 3 left its front stop, the momentary excitation of windings 6 will, in most cases, cause the re-attraction of the armature of relay 3, with consequent reënergization of the magnet of relay 9 and consequent shunting in again of resistance 12. It will be seen, therefore, that under normal operating conditions, the alternate energization and deënergization of windings 6, due to charge and discharge of condenser 14, will keep the voltage of the armature circuit of generator 1 very close to that value at which the armature of relay 3 tends to leave its front stop; and it is only under external conditions such as tend to cause rather great variations in voltage that the windings 4 really come into play. In such case, the action of coils 4 causes the armature of relay 3 to linger against one contact or the other, as required to build up, or decrease, the field strength, as the case may be, to effect the desired correction in voltage. Owing to the rapid action of the condenser, the vibrations of the armature of relay 3 are very rapid, as compared with the normal changes of voltage of the generator.

Windings 5 are not in all cases necessary, but are convenient, since they give a certain compounding action, as follows: When the generator is under no load, that is to say, when no current is flowing in the external circuit, of course, there is no flow through windings 5; but as the load in the external circuit increases, the flow of current through the windings 5 will increase and the flow through these windings 5 will be in a direction opposite to that of the flow through the windings 4, thereby tending to counterbalance to a greater or less extent (depending upon the ratios of windings 5 and 4) the increased flow of current through windings 4 due to the increasing load on the generator. The action is similar to that of the field coils of a compound wound generator.

As shown in Fig. 1ª, the field coil 2 may be a shunt coil instead of a separately excited coil.

Figure 2:
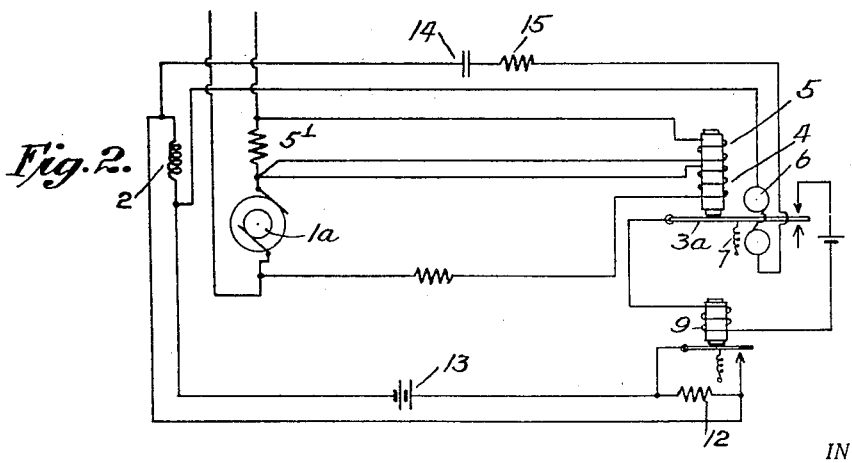
Fig. 2 is a view generally similar to Fig. 1 except that the principal control relay is of the polar type, and except that the generator shown is of the alternating type.

Fig. 2 shows an arrangement analogous to that of Fig. 1 except that the main control relay 3ª is a polar relay having certain additional magnet coils, 4 and 5, acting upon the armature in one direction only; and except that, in the particular arrangement shown in Fig. 2, the generator is an alternating current generator, though the arrangement shown is practicable for a direct current generator as well. The armature of the relay is maintained in vibration by the alternate charge and discharge of the condenser 14, as in Fig. 1; which alternate charge and discharge therefore operates the relay 9 and so causes the constant and rapid cutting in and out of resistance 12, with consequent variation in strength of the field 2 and consequent rapid and minute variations of voltage of the generator. But should the voltage rise beyond the range of control by windings 6, then windings 4 being energized sufficiently strongly to more than balance the retractile spring 7, the energizing circuit of relay 9 will remain closed for a longer period than when the vibration of the armature of relay 3 is solely under control of windings 6, and as a result the voltage of the generator will decrease. As in Fig. 1, the windings 5 tend to oppose the action of the windings 6, and exert such opposing action to a greater or less extent, according to whether the load on the generator be greater or less. The retractile spring 7 is adjusted to just counterbalance the combined action of the windings 4 and 5 when the voltage of the generator is normal.

Figure 3:
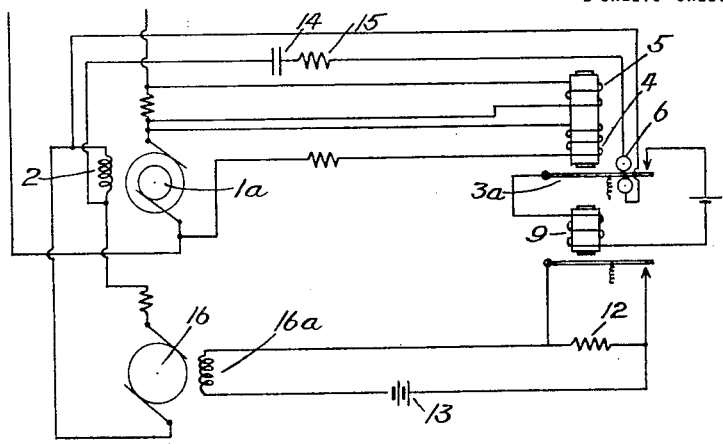
Fig. 3 is a view similar to Fig. 2, except that the field of the generator shown is energized by a separate exciting generator.

Fig. 3 shows an arrangement similar to that of Fig. 2 except that the field of the generator is here shown as excited by a separate exciting generator 16, the field circuit 16ª, of which is controlled by the relay 9 in the same manner that said relay 9 controls the field of the generator 1ª in Fig. 2.

Figure 4:
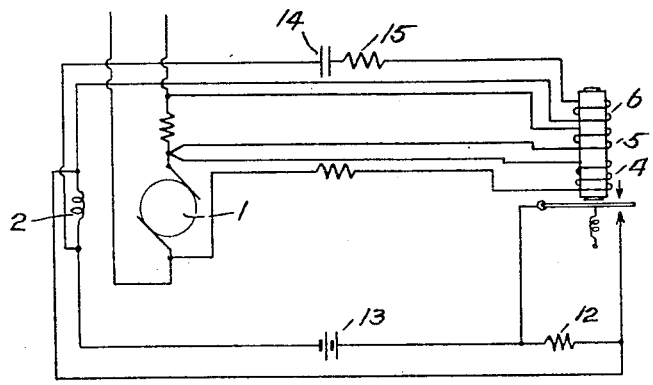
Fig. 4 is another diagrammatic view illustrating an alternative arrangement.

In the arrangement shown in Fig. 4, the relay 9 has been omitted, the armature of relay 3 controlling the field circuit of the generator directly by cutting in or shunting out resistance 12.

What I claim is:

1. The combination with a generator having armature and field circuits, of relay means having an armature controlling the field strength of that generator, means for maintaining the armature in vibration at a rate relatively high as compared with ordinary changes of voltage of the generator, and comprising a quickening condenser, and electromagnetic means affected by voltage variation of the generator and arranged, in the event of material voltage variation, to prolong the period of rest of such armature on one side or the other, as required to correct such voltage variation.

2. The combination with a generator having armature and field circuits, of relay means having an armature controlling the field strength of that generator, and having magnet coils in shunt with respect to the field of such generator, means for causing current variations in such magnet coils at a rate relatively high as compared with ordinary changes of voltage of the generator, and electromagnetic means affected by voltage variation of the generator and arranged, in the event of material voltage variation, to prolong the period of rest of such armature on the one side or the other, as required to correct such voltage variation.

3. The combination with a generator having armature and field circuits, of relay means having an armature controlling the field strength of that generator, and having magnet coils in shunt with respect to the field of such generator, a condenser in circuit with said magnet coils for causing current variations in such magnet coils at a rate relatively high as compared with ordinary changes of voltage of the generator, and electromagnetic means affected by voltage variation of the generator and arranged, in the event of material voltage variation, to prolong the period of rest of such armature on the one side or the other, as required to correct such voltage variation.

4. The combination with a generator having armature and field circuits, of relay means having an armature controlling the field strength of that generator, and having magnet coils and means for causing current variations therein at a rate relatively high as compared with ordinary changes of voltage of the generator, such means comprising a quickening condenser, such relay having other magnet coils in shunt with respect to the armature circuit of the generator and thereby affected by voltage variation of the generator and arranged, in the event of material voltage variation, to prolong the period of rest of such armature on the one side or the other, as required to correct such voltage variation.

5. The combination with a generator having armature and field circuits, of relay means having an armature controlling the field strength of that generator, and having magnet coils in shunt with respect to the field of such generator, a condenser in circuit with said magnet coils for causing current variations in such magnet coils at a rate relatively high as compared with ordinary changes of voltage of the generator, such relay having other magnet coils in shunt with respect to the armature circuit of the generator and thereby affected by voltage variation of the generator and arranged, in the event of material voltage variation, to prolong the period of rest of such armature on the one side or the other, as required to correct such voltage variation.

6. The combination with a generator having armature and field circuits, of relay means having an armature controlling the field strength of that generator, and having magnet coils in shunt with respect to the field of such generator, means for causing current variations in such magnet coils at a rate relatively high as compared with ordinary changes of voltage of the generator, such relay having other magnet coils in shunt with respect to the armature circuit of the generator and thereby affected by voltage variation of the generator and arranged, in the event of material voltage variation, to prolong the period of rest on the one side or the other, as required to correct such voltage variation.

7. The combination with a generator having armature and field circuits, of relay means having an armature controlling the field strength of that generator, electro-magnetic means for maintaining the armature in vibration at a rate relatively high as compared with ordinary changes of voltage of the generator, and comprising in a circuit of its magnet a condenser arranged and adapted to quicken the vibrations of said armature, and electro-magnetic means affected by voltage variation of the generator, and arranged, in the event of material voltage variation, to prolong the period of rest of such armature on one side or the other, as required to correct such voltage variation.

8. The combination with a generator having armature and field circuits, of relay means having an armature controlling the field strength of that generator, and having magnet coils and means for causing current variations therein at a rate relatively high as compared with ordinary changes of voltage of the generator, and a condenser in circuit with such coils and arranged to quicken materially the said current variations therein, such relay having other magnet coils in shunt with respect to the armature circuit of the generator, and thereby affected by voltage variation of the generator, and arranged, in the event of material voltage variation, to prolong the period of rest of such armature on the one side or the other, as required to correct such voltage variation.

In testimony whereof I have signed this specification in the presence of two subscribing witnesses.

JOSEPH W. MILNOR.

Witnesses:
H. M. MARBLE,
ETHEL JOHNES.